(12) United States Patent
Ozev et al.

(10) Patent No.: US 12,736,429 B2
(45) Date of Patent: Sep. 15, 2026

(54) SYSTEM FOR TESTING ACCELERATION AND FORCE RESPONSIVE SENSORS

(71) Applicants: Sule Ozev, Phoenix, AZ (US); Ishaan Bassi, Tempe, AZ (US)

(72) Inventors: Sule Ozev, Phoenix, AZ (US); Ishaan Bassi, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 293 days.

(21) Appl. No.: 18/599,092

(22) Filed: Mar. 7, 2024

(65) Prior Publication Data

US 2024/0302239 A1 Sep. 12, 2024

Related U.S. Application Data

(60) Provisional application No. 63/489,715, filed on Mar. 10, 2023.

(51) Int. Cl.

*G01L 25/00* (2006.01)
*G01P 21/00* (2006.01)
*H02J 50/10* (2016.01)

(52) U.S. Cl.

CPC .............. *G01L 25/00* (2013.01); *G01P 21/00* (2013.01); *H02J 50/10* (2016.02)

(58) Field of Classification Search

None

See application file for complete search history.

(56) References Cited

U.S. PATENT DOCUMENTS 9,494,479 B2 * 11/2016 Rogalla .................. G01M 1/24
2014/0303926 A1 * 10/2014 Sessego .................. G01L 25/00 702/104

* cited by examiner

*Primary Examiner* — Eric S. McCall
*Assistant Examiner* — Nigel H Plumb
(74) *Attorney, Agent, or Firm* — FULLER IP LAW LLC; Rodney J. Fuller

(57) ABSTRACT

A system for testing sensors is disclosed. The system includes a platform having a plurality of mounting holes and a microcontroller, the microcontroller having a wireless network interface. The system also includes a mount releasably coupled to the platform through a mounting hole, the mount configured to hold a sensor. The system includes a motor operatively coupled to the platform, and a motor controller communicatively coupled to the motor and configured to drive the motor to rotate the platform about an axis of rotation at a target speed. The microcontroller is communicatively coupled to a sensor releasably coupled to the mount. The microcontroller is configured to receive a measurement from the sensor that is output by the sensor in response to the platform being rotated such that the mount is subjected to a constant centripetal force. The microcontroller is configured to wirelessly transmit the measurement to an external device.

20 Claims, 7 Drawing Sheets

SYSTEM FOR TESTING ACCELERATION AND FORCE RESPONSIVE SENSORS

RELATED APPLICATIONS

This application claims the benefit of the U.S. provisional patent application 63/489,718, filed Mar. 10, 2023, titled "System and Method for Testing Accelerometers," entirety of the disclosure of which is hereby incorporated by this reference.

STATEMENT REGARDING FEDERALLY SPONSORED RESEARCH

This invention was made with government support under 80NSSC21C0023 awarded by the National Aeronautical & Space Administration. The government has certain rights in the invention.

TECHNICAL FIELD

Aspects of this document relate generally to the testing and characterization of force and acceleration-responsive sensors and devices.

BACKGROUND

Accelerometers have applications in a staggering range of industries and technologies, from transportation, manufacturing, and defense, to healthcare, consumer electronics, and Internet of Things applications. Accelerometers provide an accurate and inexpensive interface between the physical world and the intangible realm of computing, offering novel methods for observation (e.g., car crash detection in a smart watch, etc.) and interaction (e.g., motion-sensitive gaming controllers, etc.).

The sensitivity of an accelerometer (or similar motion or pressure sensors) is typically measured using large heavy duty shaking devices which conventionally shake in a linear motion, usually up and down. This shaking subjects the accelerometer to accelerations that are sinusoidal, rather than constant. This is because the shaking plate must oscillate between two high and low points, between which it accelerates and deaccelerates. The sensor's response to this stimulus is measured, and from there the sensitivity is calculated.

Although characterization of accelerometers is commonly done using these industrial shakers, and they are well suited for high frequency vibration testing, they have several drawbacks. Sometimes it is not possible to test multiple sensors at the same time on such a device. In many cases, all devices being tested are subject to the same forces, slowing down the characterization of a class of devices across a spectrum of forces/accelerations. They are also unable to apply a constant acceleration to the sensors being tested. Typically, the sensor being tested is connected to an acquisition systems using wires, which limits the range of motion the shaker can use. Construction of these test systems tends to be expensive and complicated, limiting their use in non-industrial or laboratory settings.

SUMMARY

According to one aspect, a system for testing sensors includes a platform including a plurality of mounting holes and a microcontroller, the microcontroller including a wireless network interface; a mount releasably coupled to the platform through a mounting hole of the plurality of mounting holes, the mount configured to hold a sensor; a motor operatively coupled to the platform; a motor controller communicatively coupled to the motor and configured to drive the motor to rotate the platform about an axis of rotation at a target speed; wherein the microcontroller is communicatively coupled to a sensor releasably coupled to the mount; wherein the microcontroller is configured to receive a measurement from the sensor that is output by the sensor in response to the platform being rotated about the axis of rotation at the target speed while the sensor is held by the mount at a radial distance from the axis of rotation such that the mount is subjected to a constant centripetal force; and wherein the microcontroller is configured to wirelessly transmit the measurement to an external device.

Particular embodiments may comprise one or more of the following features. The system may include an inductive charging receiver coupled to the platform and communicatively coupled to the microcontroller. The system may include a wireless charging coil communicatively coupled to a power source and located proximate the platform such that power may be transferred between the wireless charging coil and the inductive charging receiver while the platform is rotating. The plurality of mounting holes may be equidistant from the axis of rotation. A first mount may be shaped to keep a first sensor at a mount distance from a center of a mounting hole the first mount is releasably coupled to, and a second mount may be shaped to keep a second sensor at the mount distance from a center of a mounting hole the second mount is releasably coupled to, such that the distance between the first sensor and the axis of rotation may be equal to the distance between the second sensor and the axis of rotation. The first sensor and the second sensor may be heterogeneous. The system may include a plurality of mounts. The microcontroller may be configured to be communicatively coupled to, and receive measurements from, a plurality of sensors held in the plurality of mounts. The sensor may be a pressure sensor having a surface area. The mount may include a mass slidably coupled to the mount and able to move in a radial direction when the mount is releasably coupled to the platform. The mass may be positioned between the pressure sensor and the axis of rotation when the mount is releasably coupled to the platform such that the rotation of the platform causes the mass to exert a constant centripetal force on the surface area of the pressure sensor. The mount may include an axel along which the mass slides. The sensor may be an accelerometer. The microcontroller may be communicatively coupled to sensor through the platform, and the sensor may be communicatively coupled to the platform through the mount.

According to another aspect of the disclosure, a system for testing sensors includes a platform including a microcontroller; a mount releasably coupled to the platform and configured to hold a sensor; a motor operatively coupled to the platform; and a motor controller communicatively coupled to the motor and configured to drive the motor to rotate the platform about an axis of rotation at a target speed; wherein the microcontroller is communicatively coupled to a sensor releasably coupled to the mount; wherein the microcontroller is configured to receive a measurement from the sensor that is output by the sensor in response to the platform being rotated about the axis of rotation at the target speed while the sensor is held by the mount at a radial distance from the axis of rotation such that the mount is subjected to a constant centripetal force.

Particular embodiments may comprise one or more of the following features. The microcontroller may include a wireless network interface and may be configured to wirelessly transmit the measurement to an external device. The system may include a plurality of mounts. The microcontroller may be configured to be communicatively coupled to, and receive measurements from, a plurality of sensors held in the plurality of mounts. The system may include an inductive charging receiver coupled to the platform and communicatively coupled to the microcontroller. The system may include a wireless charging coil communicatively coupled to a power source and located proximate the platform such that power may be transferred between the wireless charging coil and the inductive charging receiver while the platform is rotating. The platform may include a plurality of mounting holes. The mount may be releasably coupled to the platform through a mounting hole of the plurality of mounting holes. The plurality of mounting holes may be equidistant from the axis of rotation. A first mount may be shaped to keep a first sensor at a mount distance from a center of a mounting hole the first mount is releasably coupled to, and a second mount may be shaped to keep a second sensor at the mount distance from a center of a mounting hole the second mount is releasably coupled to, such that the distance between the first sensor and the axis of rotation is equal to the distance between the second sensor and the axis of rotation. The first sensor and the second sensor may be heterogeneous. The system may include a battery coupled to the platform and communicatively coupled to the microcontroller. The sensor may be a pressure sensor having a surface area. The mount may include a mass slidably coupled to the mount and able to move in a radial direction when the mount is releasably coupled to the platform. The mass may be positioned between the pressure sensor and the axis of rotation when the mount is releasably coupled to the platform such that the rotation of the platform causes the mass to exert a constant centripetal force on the surface area of the pressure sensor. The mount may further include an axel along which the mass slides. The sensor may be an accelerometer. The microcontroller may be communicatively coupled to sensor through the platform. The sensor may be communicatively coupled to the platform through the mount.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
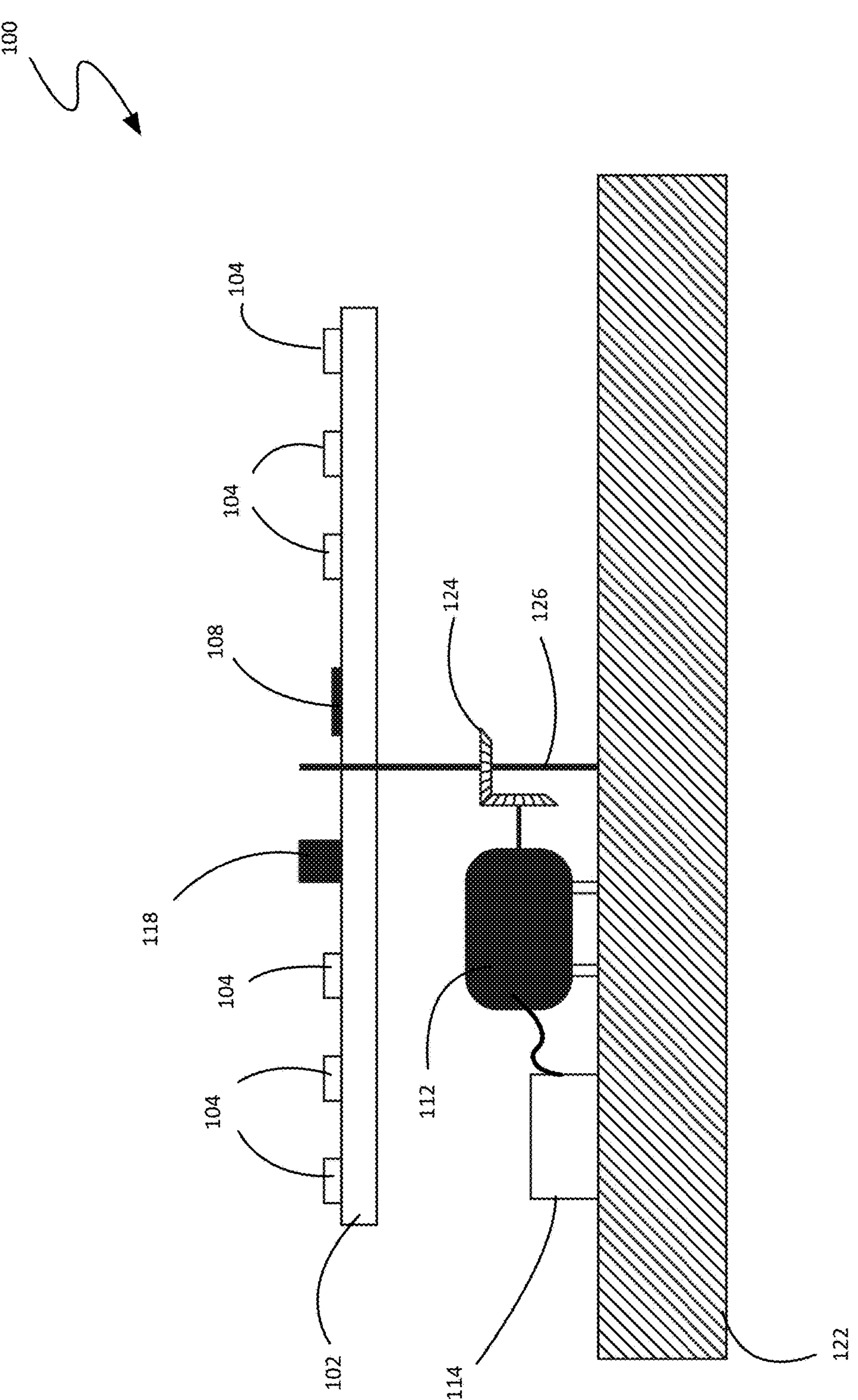
FIGS. 1A and 1B are front and top views of a testing system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Contemplated herein is a system and method for testing acceleration and force responsive sensors that overcomes the drawbacks of conventional testing methods. The contemplated testing system is able to apply a constant acceleration to the sensor(s) being tested in a controlled manner, by rotating a platform at a fixed speed. The sensor is mounted to the platform. The measurements made by the sensor being spun are gathered by a microcontroller, also mounted to the platform. The contemplated system is less expensive to make and operate, and is also easier to use than conventional shaker-based testing systems.

Advantageous over conventional testing systems, the contemplated system does not require cables running to the test platform, according to various embodiments. This simplifies use, lowers cost and footprint size, and removes a constraint that typically limits the conventional systems. In some embodiments, the microcontroller sends the measurements to an external device wirelessly. In other embodiments, the microcontroller may store the measurements in memory, to be retrieved after the test has been run.

Conventional testing systems are sometimes limited in the number of devices they can test simultaneously. The platform of the contemplated system can hold multiple devices for testing, according to various embodiments. The capacity for simultaneous devices under test (DUT) by the contemplated testing system is only limited by the size of the platform and the bandwidth for dealing with simultaneous streams of data from the DUTs, which may be addressed simply by adding additional microcontrollers to the platform. Some embodiments may be able to test 50 accelerometers at a time, while other embodiments may be able to test even more.

Another advantage the contemplated system has over conventional testers is scalability. The contemplated system can be constructed inexpensively at various scales, with some embodiments small enough for lab testing and research use to other embodiments large enough for use in manufacturing facilities where a large number of sensors need to be calibrated quickly and accurately.

It should be noted that while much of the following discussion is done in the context of testing accelerometers, the contemplated system and method may be used to test, characterize, calibrate or validate similar devices and sensors including, but not limited to, some types of motion and pressure sensors, as well as other sensors that operate on similar principles as accelerometers. These shall hereinafter be referred to as acceleration- and force-responsive sensors, meaning sensors that generate signals proportional to, or otherwise dependent upon, the magnitude of acceleration or force encountered. Embodiments of the contemplated testing system adapted for use with pressure sensors will be discussed in the context of FIG. 5, below. Those skilled in the art will recognize that the contemplated system and method may be adapted for use with other device testing methodologies known in the art.

When an object is rotated at a speed, a radial force acts on the object. When an object moves in a circular path at a fixed angular velocity, then a constant radial force is applied on the object. This force is called the centripetal force and is given by the following equation:

$$F_c = \frac{mv^2}{r}$$

Where F is the force, m is the mass, v is the velocity and r is the distance from the axis of rotation. Hence, the radial acceleration (a) of the object can be given as $a=v^2/r$.

The contemplated system and method makes use of centripetal force. Specifically, rotating the platform the sensor is attached to at a fixed speed to subject the sensor to a constant acceleration from the resulting centripetal force.

The acceleration being applied to a sensor by the contemplated system can be controlled through modifying the rotation speed of the platform and the radial distance of the sensor (i.e., the distance between the sensor and the axis of rotation). Changing these two parameters allows the system to apply a desired constant acceleration to the sensor being tested.

The speed, or revolutions per minute (RPM), and radial distance (r) can be controlled accurately to get different values of acceleration. According to various embodiments, a motor is used to rotate the platform at a desired number of revolutions per minute (RPM). RPM can be converted into angular velocity @. The relation between RPM and angular velocity is given by, $$\omega = \frac{2\pi RPM}{60}$$

Thus, acceleration can be written in terms of speed RPM and radial distance r:

$$a = \omega^2 r$$

$$a = \left(\frac{2\pi RPM}{60}\right)^2 r$$

Figure 1B:
Figure 1B:
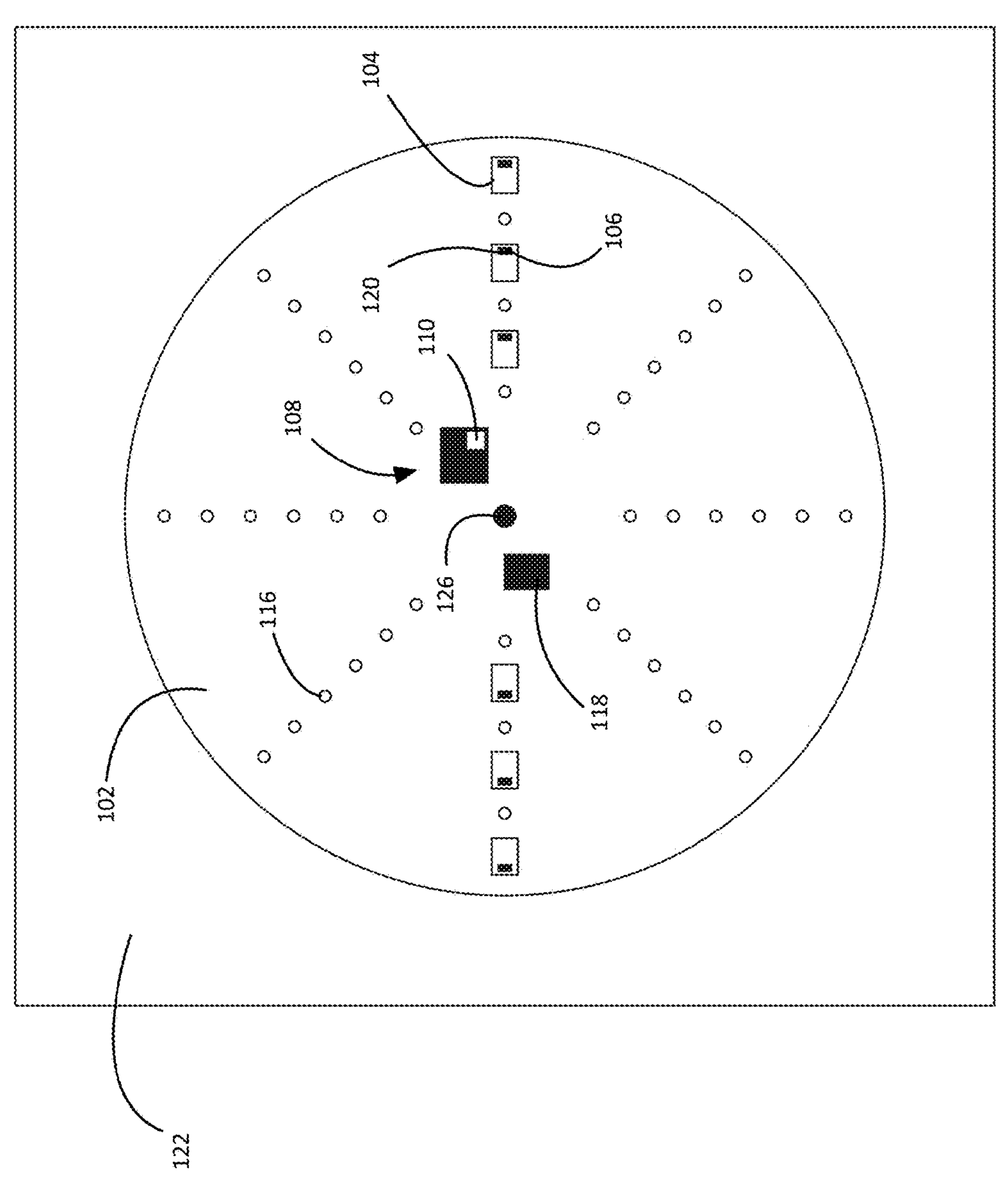

FIGS. 1A and 1B are front and top views of a non-limiting example of a testing system 100. As shown, the system 100 comprises a platform 102, a microcontroller 108, and a mount 104 used to secure a sensor 106 to the platform 102. The system 100 also comprises a motor 112, a motor controller 114, according to various embodiments. Each will be discussed, below.

According to various embodiments, the platform 102 is a structure or piece of material able to hold the weight of the testing equipment and sensors 106 being tested while withstanding being spun at the desired speeds. The actual size, shape, and material will vary, depending on the intended use. As a specific example, in one embodiment, the platform 102 is a circular disk made of 0.25" thick plexiglass. In some embodiments, the platform 102 may be planar, while in other embodiments the platform 102 may be shaped to facilitate the testing of multiple devices having various orientations with respect to the direction of the applied centripetal force.

In the non-limiting example shown in FIGS. 1A and 1B, the sensors 106 being tested are accelerometers 120. While much of the following discussion will be done in the context of testing accelerometers 120, some other sensors 106 may be tested using an identical setup, and still others may be tested after a few small modifications to the system 100. For example, this setup being discussed here for testing accelerometers 120 can be used to test pressure sensors by simply changing the mount 104 used to secure the sensor 106, as will be discussed in greater detail with respect to FIG. 5, below.

The sensor 106 or sensors 106 being tested are releasably coupled to the platform 102. In some embodiments, the sensor 106 may be directly attached to the platform 102, while in other embodiments, including the non-limiting example shown in FIGS. 1A and 1B, the sensor 106 may be releasably coupled to a mount 104, which is releasably coupled to the platform 102. The sensor 106 may be releasably coupled to the mount 104 using any means or method known in the art including, but not limited to, pins mated to holes in the mount, clamps, spring-loaded bumpers, elastic straps, and the like. In some embodiments, the sensor 106 may be releasably coupled to the mount 104 through an intermediary structure that releasably couples to both the sensor 106 and the mount 104.

In some embodiments, the sensors 106 may be attached to the platform 102 anywhere, or at any distance from the central axis or axis of rotation. In other embodiments, the attachment of the sensors 106 may be limited to a collection of predefined locations having known radial separations from the axis, facilitating the characterization of the sensors 106.

For example, in some embodiments, the platform 102 may comprise a plurality of mounting holes 116 at different radial distances, which will result in the application of different accelerations that depend on the radial distance. In other embodiments, the platform 102 may comprise other structures or mechanisms to releasably couple to accelerometers 120 being tested.

In some embodiments, the system 100 may also comprise a plurality of sensor mounts 104 or adapters configured to releasably couple to the platform 102 at predefined locations (e.g., mounting holes 116, etc.) and also releasably couple to or otherwise securely hold the sensor 106 in place during testing.

It should be noted that while FIG. 1B depicts each mount 104 being releasably coupled to the platform 102 through a single hole 116, in other embodiments the platform may comprise sets of holes 116 at each predefined location such that each mount 104 is coupled to two or more holes 116, which provides additional stability.

The use of mounts 104 to hold the sensors 106 in place provides a number of advantages. They can be formed to hold a sensor at any desired orientation relative to the platform 102 (and the direction of the centripetal force 206 being exerted), so the sensitivity of multidimensional accelerometers 120 and other sensors may be measured. According to some embodiments, these mounts 104 may be easily fabricated, bespoke for a specific sensors 106, using rapid and inexpensive manufacturing techniques like 3D printing. Furthermore, the use of mounts 104 can increase efficiency, speeding up the process testing multiple devices at the same time.

Other embodiments may employ any other methods, mechanisms, or materials known in the art to temporarily attach a sensor 106 to the platform 102. Examples include, but are not limited to, adhesives, sandwiched between the platform 102 and an elastomer cover, tabs on the surface of the platform 102 that serve as backstops preventing sliding in the radial and/or rotational directions, and the like.

The platform 102 is configured to spin about a radius, propelled by a motor 112. The motor 112 is operatively coupled to the platform 102, meaning it is attached in such a way that it can rotate the platform. Those skilled in the art will recognize the wide range of methods for rotating a structure. In some embodiments, including the non-limiting example shown in FIGS. 1A and 1B, the platform 102 may have a through hole in the middle sized to receive a shaft 126 that is rotatably coupled to a base support 122 and operatively coupled to a motor 112 such that it (and the platform 102) spins. In some embodiments, the shaft 126 may be coupled to a motor 112 using miter gears 124 joined at a 90 degree angle (see FIG. 1A). Such an arrangement may be advantageous, as it allows the motor 112 to be parallel to the platform 102 and the base support 122 instead of along the axis of rotation. This reduces the height of the test setup making it more practical at small scales, and also makes it more stable.

In some embodiments, the platform 102 may rotate on a central shaft (e.g., shaft 126). In other embodiments, the platform 102 may rotate using some other structure or mechanism known in the art. As a specific example, in one embodiment, the platform 102 may spin confined to a track having ball bearings, with a motor 112 driving the spinning platform 102 from the side or near the perimeter (e.g., a wheel in contact with the edge of the platform 102, etc.). Such an arrangement may be advantageous when the weight is not evenly distributed on the platform 102.

The type of motor 112 used will depend on the desired rotational speed as well as the size and weight of the platform 102 when fully loaded. As a specific example, in one embodiment, a DC motor 112 may be used to apply centripetal force 206 greater than 1 g. Those skilled in the art will recognize that the contemplated system 100 may be adapted for use with various types of motors.

As shown, in some embodiments, the motor 112 is communicatively coupled to a motor controller 114 that is configured to drive the motor 112 to rotate the platform 102 about an axis of rotation at a target speed. The motor controller 114 is configured to receive some form of input to define the target speed, and may also be able to determine the current speed of the platform 102, according to various embodiments. As a specific example, in one embodiment, the motor 112 has internal hall effect sensors that are used to measure the RPM using an Arduino microcontroller and displayed on an LCD. The motor 112 is controlled externally using a DC motor controller 114 that has a variable resistor knob used to change the speed of the motor 112 to a desired value. Other embodiments may employ other methods for controlling the motor 112 and measuring the current speed of the platform 102 (e.g., rotary encoder, etc.).

The system 100 comprises at least one microcontroller 108 that is attached to the platform 102 and configured to receive measurements (e.g., output voltage, etc.) while the platform 102 is spinning. The measurements are generated by the sensors 106 in response to being subjected to centripetal force. As a specific example, in one embodiment the microcontroller 108 may be an Arduino UNO with a WIFI module. Other embodiments may comprise other microcontrollers 108 known in the art.

The microcontroller 108 is communicatively coupled to the sensor(s) 106 being tested. In some embodiments, each sensor 106 may be coupled to a different microcontroller 108, while in other embodiments multiple sensors 106 may be coupled to a single microcontroller 108. As a specific example, in one embodiment the microcontroller 108 is an Arduino board that has 6 analog inputs, which means it can be connected to six accelerometers 120 at a time for testing. Methods for coupling the microcontroller 108 and the sensor 106 will be discussed further with respect to FIG. 6, below.

In some embodiments, one or more of the microcontrollers 108 coupled to the platform 102 may comprise, or be coupled to, a wireless network interface 110 able to transmit the measurements 208 to an external device (e.g., computer, server, mobile device, etc.) using a wireless communication protocol (e.g., WIFI, Bluetooth, etc.). Advantageous over conventional testing systems, these embodiments of the system 100 contemplated herein do not require any cables connecting the platform 102 to an external device for data collection (or power, as discussed with respect to FIG. 4, below), allowing it to spin freely. In some embodiments, the measurements 208 may be transmitted in real time, as the microcontroller 108 receives them. WIFI can provide a large bandwidth to transfer data of multiple sensors 106 at a time. In other embodiments, the measurements 208 may be sent in batches. In still other embodiments, the measurements 208 may simply be stored within the memory of the microcontroller 108, to be retrieved through wireless or direct physical means once the test is done.

In some embodiments, the system 100 may further comprise a battery 118 communicatively coupled to the microcontroller 108 and also mounted to the platform 102. Using a battery 118 to power the various devices attached to the spinning platform 102 allows the system 100 to operate without cumbersome cabling going to the spinning platform 102. As a specific example, in one embodiment, the battery 118 may be a lithium ion 9V battery. In other embodiments, the system 100 may be powered by an external power source 404, which will be discussed in greater detail with respect to FIG. 4, below.

Figure 2:
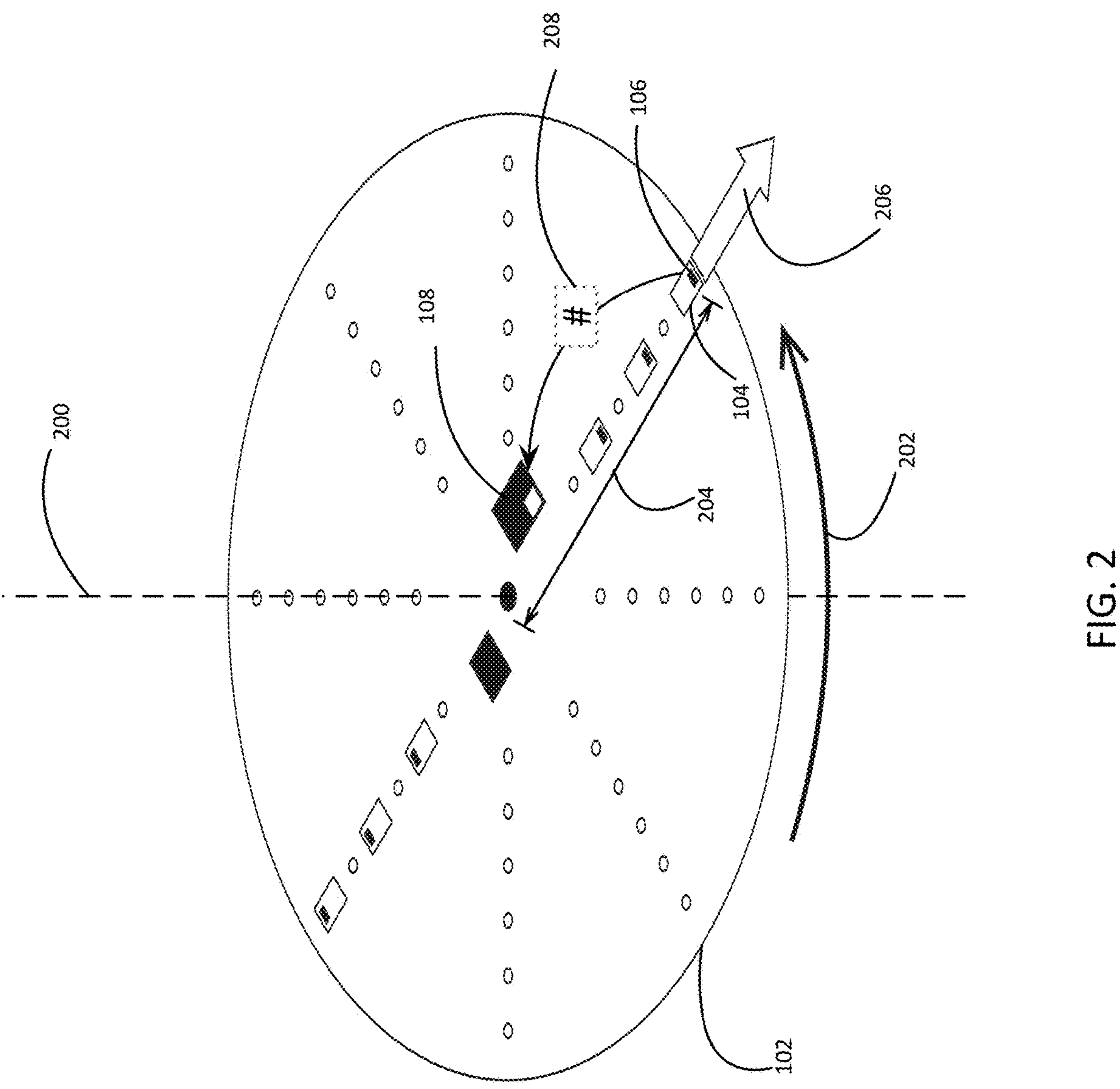
FIG. 2 is a perspective view of the testing system in use.

FIG. 2 is a perspective view of a non-limiting example of the contemplated testing system 100 in use. For clarity, some elements such as the motor 112 and the motor controller 114 are not shown, and others are depicted schematically. As previously discussed, in use the testing system 100 spins the platform 102 about an axis of rotation 200, speeding up until it has reached a target speed 202. A sensor 106 that is coupled to a mount 104 will output a measurement 208 (e.g., a voltage, a packet, etc.) in response to the platform 102 being rotated about the axis of rotation 200 at the target speed 202 while the sensor 106 is held by the mount 104 at a radial distance 204 from the axis of rotation 200 such that the mount 104 (and the sensor 106) are subjected to a constant centripetal force 206. This measurement 208 is received by, and subsequently recorded and/or transmitted, by a microcontroller 108.

One of the advantages the contemplated system 100 has over conventional testing devices is that it is able to apply a constant force or acceleration to the sensor 106 being tested. The motion of these testing devices, both the system 100 contemplated herein and the conventional devices, is periodic out of necessity.

In the context of the present description and the claims that follow, “constant acceleration” or “constant force” means the application of acceleration or force that does not vary in magnitude or direction by more than 2% for at least one period of the periodic motion driving the test (e.g., rotation of the platform 102 of the contemplated system 100, etc.). It should be noted that conventional shaker devices cannot meet this standard because within one period of the periodic motion, the platform oscillates between two points, necessitating acceleration/deceleration as well as direction change. For a conventional shaker device to provide acceleration that does not vary in magnitude or direction by more than 2% for a length of time needed to perform the tests or validations made possible by the contemplated device, the motion of the shaker platform would have to take place over a large linear space that would not be practical.

Figure 3:
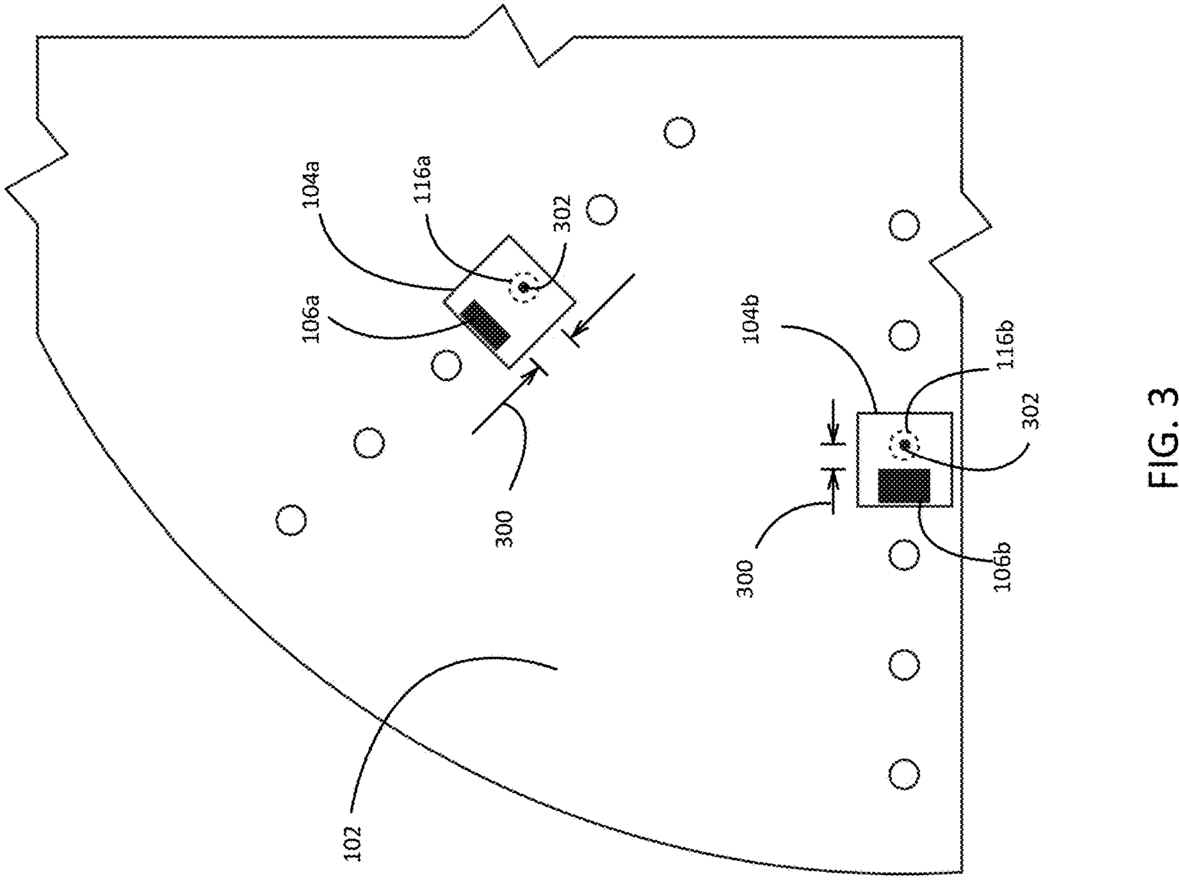
FIG. 3 is a top view of a portion of a testing system having bespoke mounts.

FIG. 3 is a top view of a portion of a non-limiting example of a testing system 100 having bespoke mounts 104. Some embodiments of the contemplated testing system 100 make use of mounts 104 to hold the sensors 106 in place during testing. One of the advantages of using mounts is that they may be easily customize for use with a specific device. Since the applied centripetal force 206 depends on the speed the platform 102 is rotating at as well as the distance of the sensor 106 from the axis of rotation 200, modification of the mount geometry can be used to adjust the radial distance 204 with precision. This is particularly useful in embodiments where the mounts attach to the platform at predefined locations, such as mounting holes 116.

In some embodiments, the mounting holes 116 (or other predefined coupling locations and methods) may be arranged radially, with sets of locations at various radial distances. This allows the system 100 to apply the same centripetal force 206 to more than one sensor 106 at a time, because each predefined location in that set is at the same radial distance. The mounts themselves may be adjusted to ensure that, when testing devices/sensors having different shapes and sizes, the point where each sensor 106 is performing the measurement may be held at the same radial distance.

As a specific example, and as shown in FIG. 3, according to various embodiments, a first mount **104*a* may be shaped to keep a first sensor 106*a* at a mount distance 300 from the center 302 of the mounting hole 116*a* that the first mount 104*a* is releasably coupled to. Furthermore, a second mount 104*b* may be shaped to keep a second sensor 106*b* at the same mount distance 300 from the center 302 of the mounting hole 116*b* that the second mount 104*b* is releasably coupled to, such that the distance between the first sensor 106*a* and the axis of rotation 200 is substantially equal to the distance between the second sensor 106*b* and the axis of rotation 200. The two mounting holes 116 are equidistant from the axis of rotation 200. This flexibility is beneficial when the first sensor 106*a* and the second sensor 106*b* are heterogeneous. As shown, they have different sizes and shapes, which is compensated for by employing different mounts 104**.

It should be note that while in this and other non-limiting examples discussed herein, a mount 104 is described as being releasably coupled to the platform 102 through a mounting hole 116, it is not limited to a single mounting hole 116. In some embodiments, the mount 104 is attached to a single mounting hole 116, while in other embodiments the mount 104 may be attached, mated to, or otherwise releasably coupled through, two or more mounting holes 116. In still other embodiments, a mount 104 may be releasably coupled to the platform through more than one way. As a specific, non-limiting example, in one embodiment, a mount 104 may be releasably coupled to the platform 102 via a mounting hole 116 (e.g., a peg extending from the mount 104 fitted into the mounting hole 116) in conjunction with magnets embedded in the platform 102 and the mount 104.

Figure 4:
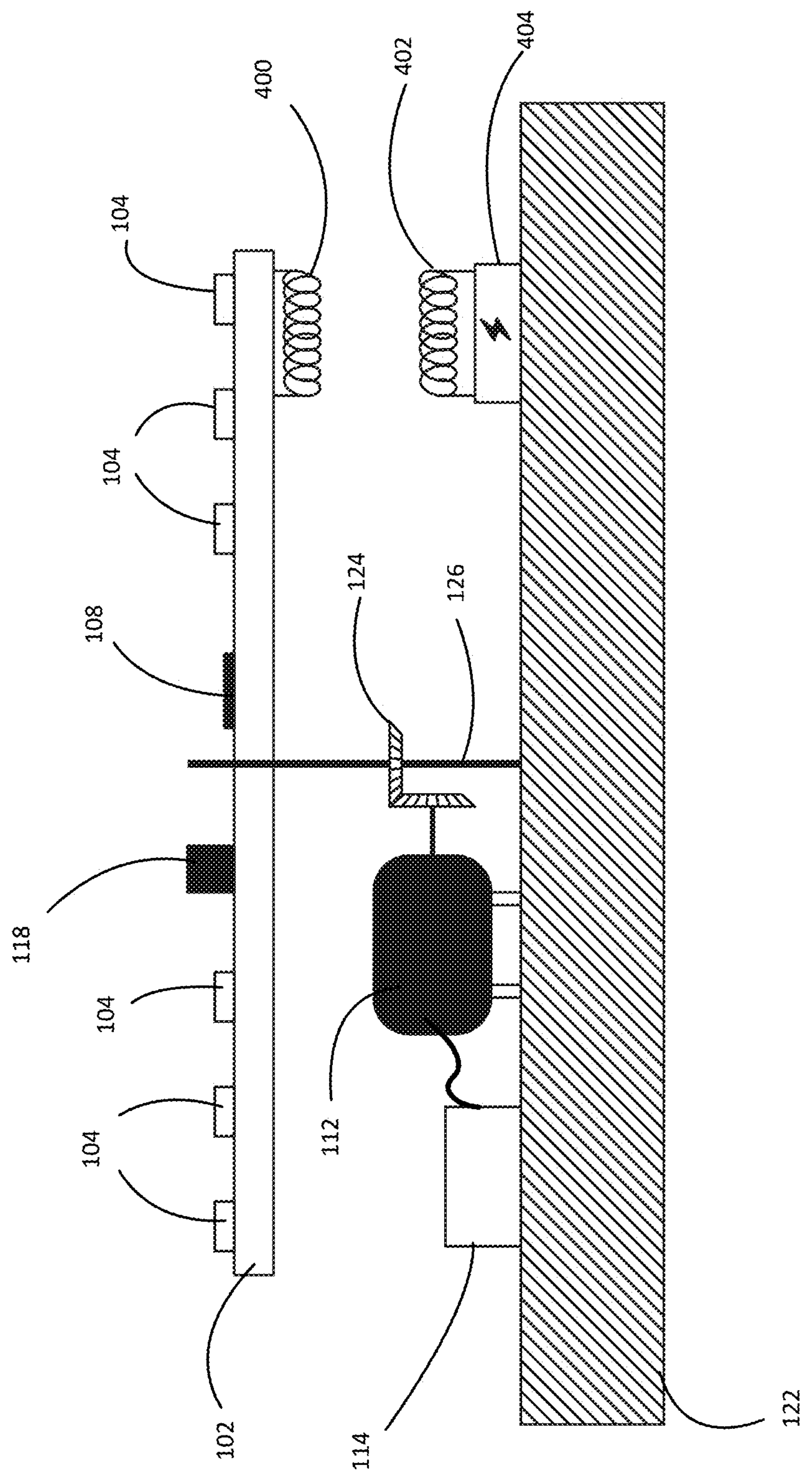
FIG. 4 is a side view of a testing system configured for wireless power transfer.

FIG. 4 is a side view of a non-limiting example of a testing system 100 configured for wireless power transfer. When testing multiple sensors 106 for longer runs, the batteries 118 may run out. Some embodiments comprise wireless charging coils 402 communicatively coupled to a power source 404 and positioned proximate to the platform 102. On the platform 102 there is one or more inductive charging receivers 400 coupled to the platform and communicatively coupled to the microcontroller 108 and/or battery 118. The inductive charging receiver 400 will receive power transmitted wirelessly by the wireless charging coil 402 through rapidly fluctuating magnetic fields, allowing a test to be performed for an extended period of time.

In some embodiments, the inductive charging receiver 400(*s*) may be coupled to a battery, while in other embodiments the system 100 may omit the battery such that the platform 102 receives all of its power from an external power source 404. Still other embodiments may be directly powered through wireless power transfer.

In the context of the present description and the claims that follow, locating the wireless charging coil 402 proximate to the platform 102 means that the wireless charging coil 402 is close enough to the platform 102 (e.g., above, below, beside, etc.) that one or more inductive charging receivers 400 on the platform 102 are able to receive a wireless power transfer while the platform 102 is rotating that is sufficient to maintain normal operation for the desired length of time (e.g., delay the complete drain of the battery long enough to complete the run, power a run indefinitely, etc.).

In other embodiments, electricity may be provided to the microcontroller 108(*s*) via the platform 102. For example, in one embodiment, electricity may be provided to the platform 102 through a shaft 126 on which the platform 102 rotates, which may be conductive. Various embodiments of the contemplated system 100 may be powered using other power transfer structures, mechanisms, and technologies known in the art, both wired and wireless.

Figure 5:
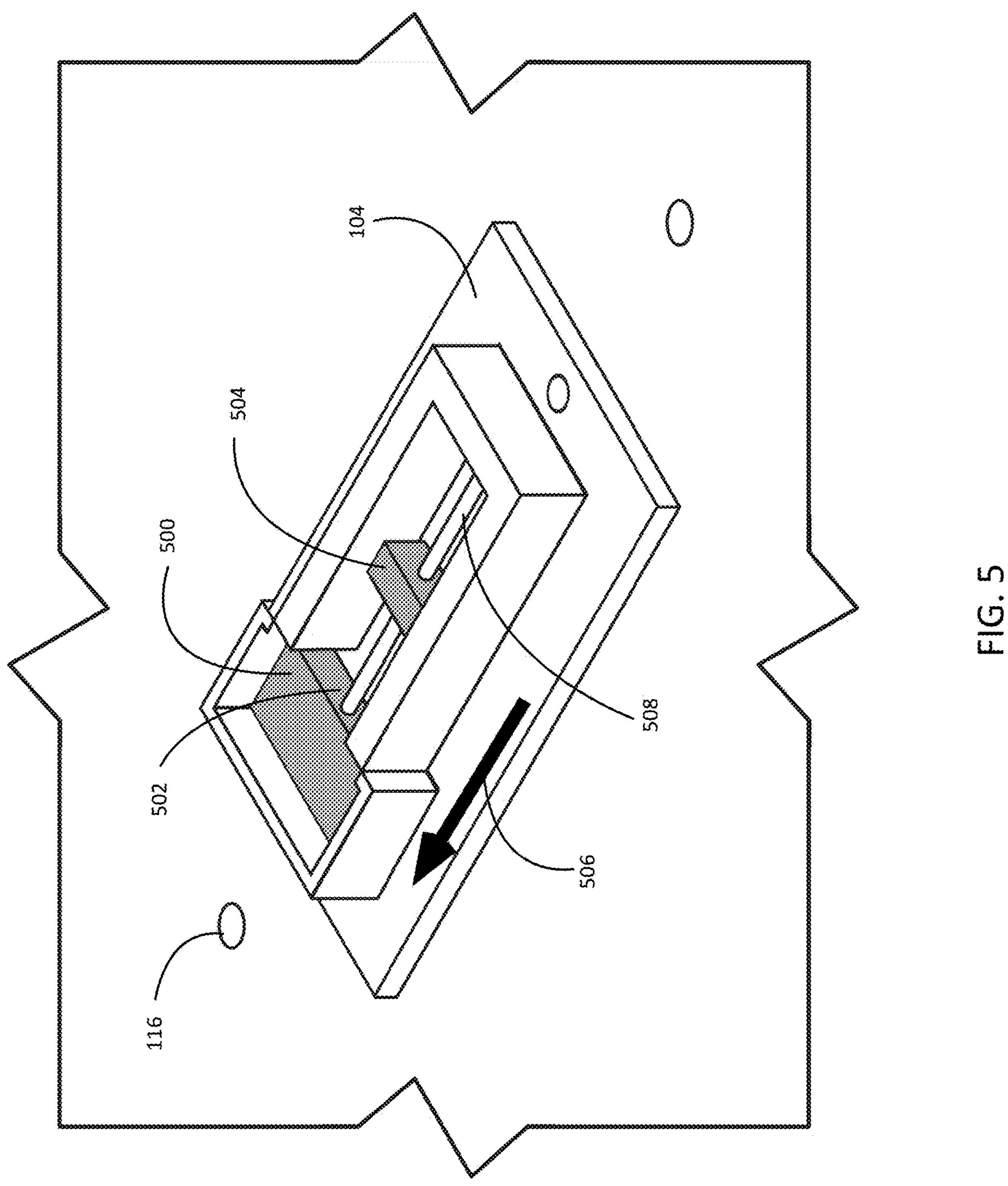
FIG. 5 is a perspective view of a testing system configured for use with a pressure sensor.

The non-limiting examples shown and discussed previously have centered around the testing of accelerometers 120. However, a testing system 100 that can apply constant radial acceleration to an accelerometer 120 may also be used to apply a constant radial force to another sensor 106 (i.e., a pressure sensor) with the incorporation of a mass that can move in a radial direction. FIG. 5 is a perspective view of a non-limiting example of testing system 100 comprising a mount 104 configured for use with a pressure sensor 500. The pressure sensor 500 detects the application of a force across a particular surface, hereinafter referred to as the surface area 502.

According to various embodiments, a mount 104 for a pressure sensor 500 comprises a mass 504 that is slidably coupled to the mount 104 and able to move in a radial direction 506 (meaning radial with respect to the axis of rotation 200) when the mount 104 is releasably coupled to the platform 102. The mass 504 is positioned between the pressure sensor 500 and the axis of rotation 200 while the mount 104 is releasably coupled to the platform 102 such that the rotation of the platform 102 causes the mass 504 to exert a constant centripetal force 206 on the surface area 502 of the pressure sensor 500. The centripetal force 206 exerted by the mass 504, minus the friction force due to the mass 504 sliding on one or more surfaces of the mount 104, is the force being applied to the sensor 106. That force, divided by the surface area 502 of the sensor 106, gives the pressure experienced by the sensor 106. Comparing that estimation with the sensor 106 output yields the sensitivity, according to various embodiments.

As shown, in some embodiments the mass 504 may be configured to slide along a guiding axel 508 or rail, to reduce the effects of friction, as well as make the friction consistent, predictable, and/or repeatable. As an option, in some embodiments the mass 504 may be easily modified (e.g., replaced, added to, removed, etc.) to adapt the system 100 for use with different sensors 106. In the non-limiting example shown in FIG. 5, the mass 504 slides along a guiding axel 508. In other embodiments, the mount 104 may comprise any known structure for reducing friction and/or making friction consistent including, but not limited to, tracks, rails, suspension, pivoting, and the like.

Figure 6:
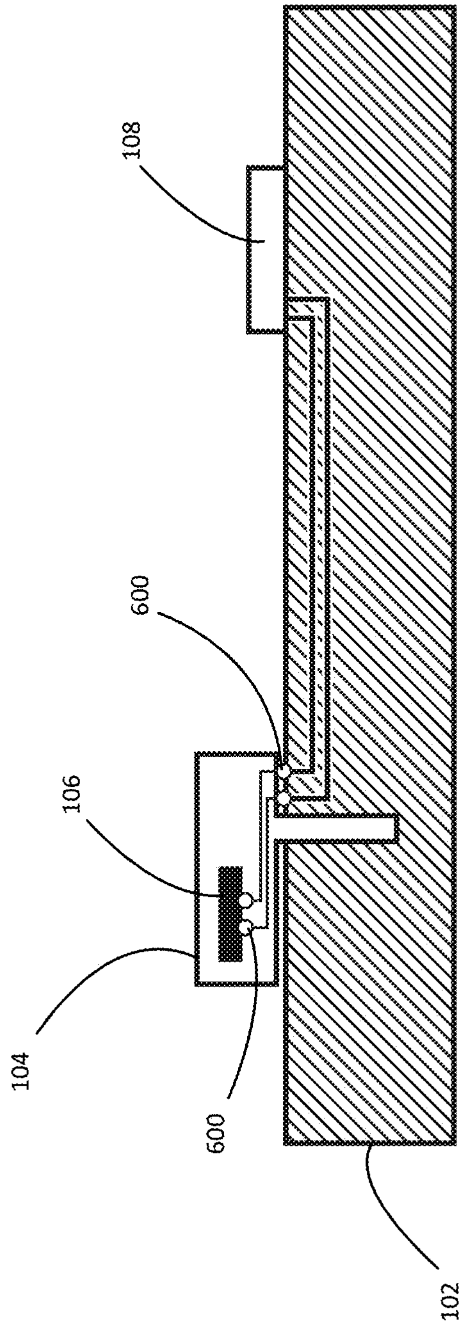
FIG. 6 is a schematic cross-sectional view of a portion of testing system with integrated wiring.

FIG. 6 is a schematic cross-sectional view of a portion of a non-limiting example of the contemplated system with integrated wiring. The view is taken along a plane that includes the axis of rotation 200, and shows the nature of the connection between a sensor 106, a mount 104, the platform 102, and the microcontroller 108, according to some embodiments. In some embodiments, the sensor(s) 106 may be directly wired to the microcontroller(s) 108. In other embodiments, a microcontroller 108 may be communicatively coupled to a sensor 106 through the platform 102. As a specific example, and as shown in FIG. 6, in some embodiments, each mounting hole 116 on a platform 102 may be wired to a microcontroller 108, meaning leads connect the microcontroller 108 input to conductive terminals 600 or similar structure (e.g., pads, etc.) that is close enough to a mounting hole that a mount 104 would be in contact with the conductive terminals 600. Thus, when the mount 104 is coupled to that mounting hole 116, it becomes communicatively coupled to the microcontroller 108 through leads or wires passing along or through the platform. The mount 104 also has conductive terminals 600 in the area that holds the sensor 106, positioned such that when the sensor 106 is releasably coupled to the mount 104, it is also communicatively coupled to the mount 104. In this way, the microcontroller 108 is communicatively coupled to sensor 106 through the platform 102, and the sensor 106 is communicatively coupled to the platform 102 through the mount 104. This also allows the microcontroller 108 to know the radial distance 204 associated with each signal it receives, without having to be reconfigured. This may streamline the testing process, which may be advantageous in industrial implementations dealing with high testing volumes.

Where the above examples, embodiments and implementations reference examples, it should be understood by those of ordinary skill in the art that other sensors, mounts, platforms, methods, and examples could be intermixed or substituted with those provided. In places where the description above refers to particular embodiments of a system and method for testing acceleration and force responsive sensors, it should be readily apparent that a number of modifications may be made without departing from the spirit thereof and that these embodiments and implementations may be applied to other sensor testing technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for testing sensors, comprising:

a platform comprising a plurality of mounting holes and a microcontroller, the microcontroller comprising a wireless network interface;

a mount releasably coupled to the platform through a mounting hole of the plurality of mounting holes;

a motor operatively coupled to the platform;

a motor controller communicatively coupled to the motor and configured to drive the motor to rotate the platform about an axis of rotation at a target speed;

wherein the microcontroller is communicatively coupled to a sensor releasably coupled to the mount;

wherein the microcontroller is configured to receive a measurement from the sensor that is output by the sensor in response to the platform being rotated about the axis of rotation at the target speed while the sensor is held by the mount at a radial distance from the axis of rotation such that the mount is subjected to a constant centripetal force; and wherein the microcontroller is configured to wirelessly transmit the measurement to an external device.

2. The system of claim 1, further comprising:

an inductive charging receiver coupled to the platform and communicatively coupled to the microcontroller; and a wireless charging coil communicatively coupled to a power source and located proximate the platform such that power is transferred between the wireless charging coil and the inductive charging receiver while the platform is rotating.

3. The system of claim 1:

wherein the plurality of mounting holes are equidistant from the axis of rotation;

wherein a first mount is shaped to keep the sensor at a mount distance from a center of a mounting hole the first mount is releasably coupled to, and a second mount is shaped to keep a second sensor at the mount distance from a center of a mounting hole the second mount is releasably coupled to, such that the distance between the sensor and the axis of rotation is equal to the distance between the second sensor and the axis of rotation; and wherein the sensor and the second sensor are heterogeneous.

4. The system of claim 1, further comprising:

a plurality of mounts;

wherein the microcontroller is configured to be communicatively coupled to, and receive measurements from, a plurality of sensors held in the plurality of mounts.

5. The system of claim 1:

wherein the sensor is a pressure sensor having a surface area;

wherein the mount comprises a mass slidably coupled to the mount and able to move in a radial direction when the mount is releasably coupled to the platform;

wherein the mass is positioned between the pressure sensor and the axis of rotation when the mount is releasably coupled to the platform such that the rotation of the platform causes the mass to exert a constant centripetal force on the surface area of the pressure sensor.

6. The system of claim 5, wherein the mount further comprises an axel along which the mass slides.

7. The system of claim 1, wherein the sensor is an accelerometer.

8. The system of claim 1, wherein the microcontroller is communicatively coupled to sensor through the platform, and the sensor is communicatively coupled to the platform through the mount.

9. A system for testing sensors, comprising:

a platform comprising a microcontroller;

a mount releasably coupled to the platform;

a motor operatively coupled to the platform; and a motor controller communicatively coupled to the motor and configured to drive the motor to rotate the platform about an axis of rotation at a target speed;

wherein the microcontroller is communicatively coupled to a sensor releasably coupled to the mount;

wherein the microcontroller is configured to receive a measurement from the sensor that is output by the sensor in response to the platform being rotated about the axis of rotation at the target speed while the sensor is held by the mount at a radial distance from the axis of rotation such that the mount is subjected to a constant centripetal force.

10. The system of claim 9, wherein the microcontroller comprises a wireless network interface and is configured to wirelessly transmit the measurement to an external device.

11. The system of claim 9, further comprising:

a plurality of mounts;

wherein the microcontroller is configured to be communicatively coupled to, and receive measurements from, a plurality of sensors held in the plurality of mounts.

12. The system of claim 9, further comprising:

an inductive charging receiver coupled to the platform and communicatively coupled to the microcontroller; and a wireless charging coil communicatively coupled to a power source and located proximate the platform such that power is transferred between the wireless charging coil and the inductive charging receiver while the platform is rotating.

13. The system of claim 9:

wherein the platform comprises a plurality of mounting holes;

wherein the mount is releasably coupled to the platform through a mounting hole of the plurality of mounting holes.

14. The system of claim 13:

wherein the plurality of mounting holes are equidistant from the axis of rotation;

wherein a first mount is shaped to keep the sensor at a mount distance from a center of a mounting hole the first mount is releasably coupled to, and a second mount is shaped to keep a second sensor at the mount distance from a center of a mounting hole the second mount is releasably coupled to, such that the distance between the sensor and the axis of rotation is equal to the distance between the second sensor and the axis of rotation; and wherein the sensor and the second sensor are heterogeneous.

15. The system of claim 9, further comprising a battery coupled to the platform and communicatively coupled to the microcontroller.

16. The system of claim 9:

wherein the sensor is a pressure sensor having a surface area;

wherein the mount comprises a mass slidably coupled to the mount and able to move in a radial direction when the mount is releasably coupled to the platform;

wherein the mass is positioned between the pressure sensor and the axis of rotation when the mount is releasably coupled to the platform such that the rotation of the platform causes the mass to exert a constant centripetal force on the surface area of the pressure sensor.

17. The system of claim 16, wherein the mount further comprises an axel along which the mass slides.

18. The system of claim 9, wherein the sensor is an accelerometer.

19. The system of claim 9, wherein the microcontroller is communicatively coupled to sensor through the platform.

20. The system of claim 19, wherein the sensor is communicatively coupled to the platform through the mount.

* * * * *